United States Patent [19]
Clark

[11] 3,992,934
[45] Nov. 23, 1976

[54] MOORING DEVICE

[75] Inventor: John Campbell Clark, Newport, United Kingdom

[73] Assignee: Strainstall Limited, Cowes, Great Britain

[22] Filed: Apr. 21, 1975

[21] Appl. No.: 566,951

[30] Foreign Application Priority Data
Apr. 26, 1974 United Kingdom............ 18392/74

[52] U.S. Cl................................. 73/143; 114/230
[51] Int. Cl.²........................................... G01L 5/10
[58] Field of Search.......... 73/143, 141 A; 114/230

[56] References Cited
UNITED STATES PATENTS

| | | |
|---|---|---|
| 3,330,154 | 7/1967 | Habern et al..................... 73/143 |
| 3,695,096 | 10/1972 | Kutsay..................... 73/141 A X |
| 3,754,610 | 8/1973 | Paelian et al...................... 177/211 |
| 3,759,094 | 9/1973 | Al....................................... 73/143 |
| 3,857,452 | 12/1974 | Hartman..................... 73/141 A X |
| 3,913,396 | 10/1975 | Elliot................................... 73/143 |

*Primary Examiner*—Charles A. Ruehl
*Attorney, Agent, or Firm*—McDougall, Hersh & Scott

[57] ABSTRACT

A mooring device having a pivotal joint which is subjected to shear strain or stress at a pin when in use. The pin is provided with at least one region having a cross section with a diameter smaller than that of the bearing surface of the pin. At least one pair of strain sensors is mounted in this region, and these are connected in an electrical circuit capable of indicating shear strain due to force applied to the pin. The pin is provided with means for keeping the plane of action of the strain sensors aligned substantially in the direction of any resultant applied force which produces the shear strain or stress.

8 Claims, 7 Drawing Figures

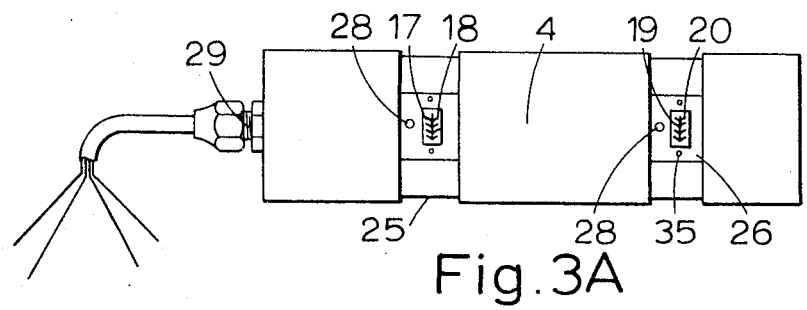
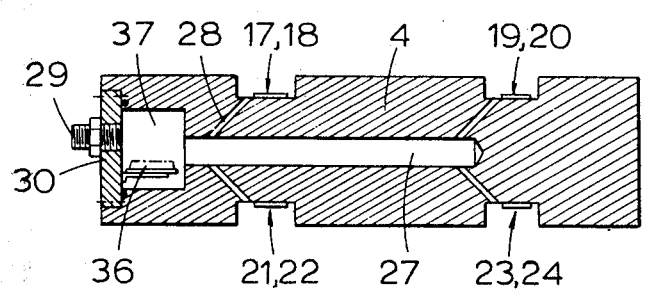
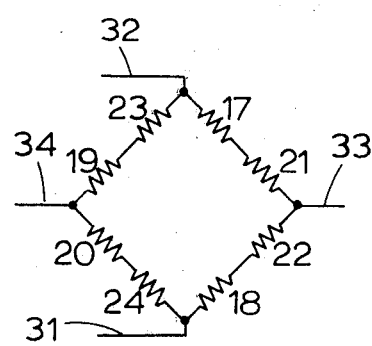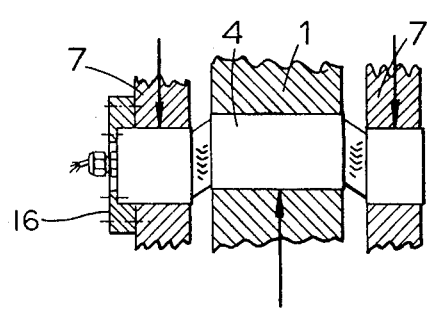
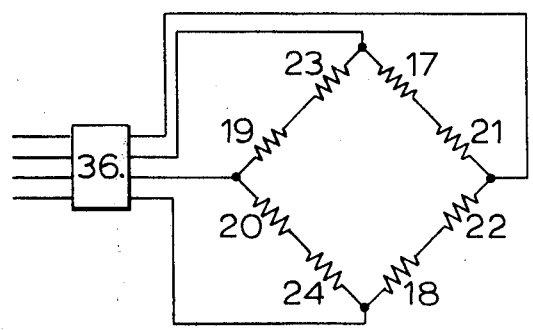

MOORING DEVICE

BACKGROUND

The present invention relates to a device for mooring a boat or other vessel, e.g. a mooring hook, pulley, shackle, winch or fairlead, or for mooring to a towing vessel.

To ensure safe and efficient mooring of large vessels the tensions in mooring lines must be monitored to reduce the risk of the vessel accidentally breaking away from its berth, e.g. a jetty, anchor or buoy, or a towing vessel.

Existing methods of computing the mooring line tensions are to attach linear strain gauges to the side plates of the mooring hook or pulley, so that the axis of the gauges is in alignment with the expected direction of the maximum principal stress. Alternatively, a gauge rosette may be attached to the side plates of the hook or pulley, which will measure the maximum principal stress and indicate the direction through which the stress is acting. Neither of these two methods is wholly satisfactory as the gauge installations are susceptible to physical damage and unknown stresses present in the side plates may produce misleading information.

It is a purpose of the present invention to provide an improved means of load sensing which may be used to provide satisfactory efficiency in the operation of mooring installations.

It has now been found that a mooring device comprising a pin in a pivotal joint can best be monitored for stress by providing a strain sensor on the pin itself.

SUMMARY

The present invention thus provides a mooring device having a pivotal joint which is subjected to shear strain or stress at a pin when in use, characterized in that the pin is provided with at least one region having a cross section with a diameter smaller than that of the bearing surface of the pin, there being mounted on said region at least one pair of strain sensors adapted to be connected into an electrical circuit capable of indicating shear strain due to force applied to the pin, said pin being provided with means for keeping the plane of action of the strain sensors aligned substantially in the direction of any resultant applied force which produces shear strain. Preferably two pairs of strain sensors are provided substantially diametrically opposed on said region. It is preferred also, to provide at least one pair of strain sensors near each end of the pin. Suitably, each pair of strain sensors may be mounted on a flattened portion of the said smaller diameter region.

BRIEF DESCRIPTON OF DRAWINGS

The invention is described in the accompanying drawings in which

FIGS. 3A and 3B represent plan and sectional views respectively of the pin of FIG. 2;

FIGS. 3C and 3D represent Wheatstone bridge circuit diagrams of strain gauge elements on the pin of FIG. 2;

FIG. 4 represents a cross sectional view through the pin of FIG. 2 along its axis when strain is applied.

Figure 1:
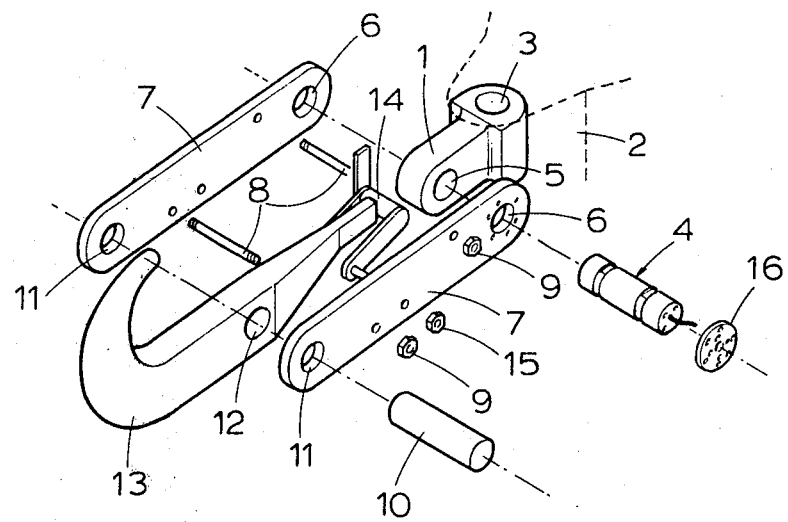
FIG. 1 represents an exploded view of one embodiment of a towing or mooring hook of the invention.

A trunnion 1 is mounted vertically in a base 2; the base 2 is rotatably mounted on a jetty, berth or towing vessel with a pin (not shown) passing through a hole 3. A pin 4, made of steel or other suitable metal, is journalled in bearing 5 in trunnion 1 and passes through holes 6 in cheek plates 7 located on each side of trunnion 1. Cheek plates 7 are maintained in spaced relationship by partially threaded spacer bars 8 secured by nuts 9. A pin 10 passes through holes 11 in cheek plates 7 and is journalled in bearing 12 in a hook 13. A release mechanism 14, secured by nuts 15, is located between cheek plates 7 and is operable in known manner to release the eye of a mooring or towing line (not shown) passed over hook 13.

In operation, the total tension in the mooring or towing line is transmitted through the hook 13 and cheek plates 7 assembly, via pin 4 to trunnion 1: hence, the pin 4 is subjected to double shear at the interfaces between cheek plates 7 and trunnion 1.

A locking plate 16 secures the pin 4 to the outer face of one of the cheek plates 7, thereby preventing relative rotation.

The shear strain induced in pin 4 under the action of the mooring or towing line is monitored by means of 4 pairs of strain sensors constituted by strain gauge elements 17, 18, 19, 20, 21, 22, 23, 24 (see FIGS. 2, 3A and 3B) which are mounted on the external surface of the pin at the position of the interfaces between cheek plates 7 and trunnion 1. The sensors are arranged in known manner to measure shear strain, elements 17, 18 and 19, 20 being located on the surface of the pin 4 at an angle of 180° to elements 21, 22 and 23, 24. Prior to mounting the sensors the pin is relieved around its circumference over regions 25 to produce a cross section with a diameter smaller than that of the bearing surface of the pin to eliminate the application of direct compressive stresses by cheek plates 7 and trunnion 1 to the sensors on the relieved regions 25.

Two pairs of diametrically opposed and parallel flats 26 are machined in the relieved regions 25, the sensors being mounted on these flats. Prior to locking by means of plate 16, the pin 4 is orientated with respect to the cheek plates 7, so that the plane of the flats and hence of the gauge elements is parallel to the line of action of applied load.

An axial channel 27 is provided through the pin 4 with subsidiary channels 28 extending therefrom to the locations of the gauge elements (see FIG. 3B).

The gauge elements 17 to 24 are interconnected in the form of a Wheatstone bridge as shown in FIG. 3C, connecting leads (not shown) passing through the channels 27 and 28.

On a cover plate 30 secured to the end of pin 4 there is provided a plug and socket arrangement 29, whereby an input voltage may be supplied to connections 31 and 32 of the Wheatstone bridge and the electrical output from the bridge taken from connections 33 and 34.

When mechanical tension is applied from a mooring or towing line to the hook 13 in FIG. 1, the resulting shear strain induced in the pin 4 causes it to be deformed as shown in FIG. 4, the deformation being proportional to the tension applied to the hook; the electrical resistance of the strain gauge elements 17 to 24 also changes, so that the electrical output from the bridge changes, thus giving a measure of the tension in a line secured to hook 13.

Since the pin 4 is locked to the cheek plates 7, the planes of action of the gauge elements remain parallel to the line of action of the applied load when the stress from a mooring line changes direction.

The use of 4 pairs of strain gauge sensors results in low sensitivity of the bridge to changes in stress irrelevant for the purpose of the invention, e.g. axial tension, radial compression and bending moments in the pin itself; the use of two pairs of strain gauge elements would not be quite as satisfactory.

Protective plates (not shown), constructed for example from metal, covering the strain gauge sensors may be provided and secured by means of screws located in threaded holes 35.

When very long cables are required to connect the device to display equipment showing the electrical output from the Wheatstone bridge, an amplifier 36 may be provided in a cavity 37 formed in one end of the pin 4 and secured to the inner surface of the end cover plate 30. The amplifier provides low voltage stable energization for the Wheatstone bridge of strain gauge elements and amplifies the output voltage from the bridge, so that a signal corresponding accurately to the output from the bridge is received at display equipment irrespective of cable length and spurious electrical noise signals.

Prior to fitting the end plate 30, which may be screwed on and sealed to the pin by an O ring (not shown), the cavity 37 with the amplifier may be filled with, e.g., transformer oil, the access to the channel 27 having previously been sealed with a casting resin or the like.

The amplifier 36 and cavity 37 are not necessary in many applications.

It is possible to measure the shear strain induced in pin 10 which would then be constructed as described above for the pin 4, the latter being a conventional pin.

Figure 2:
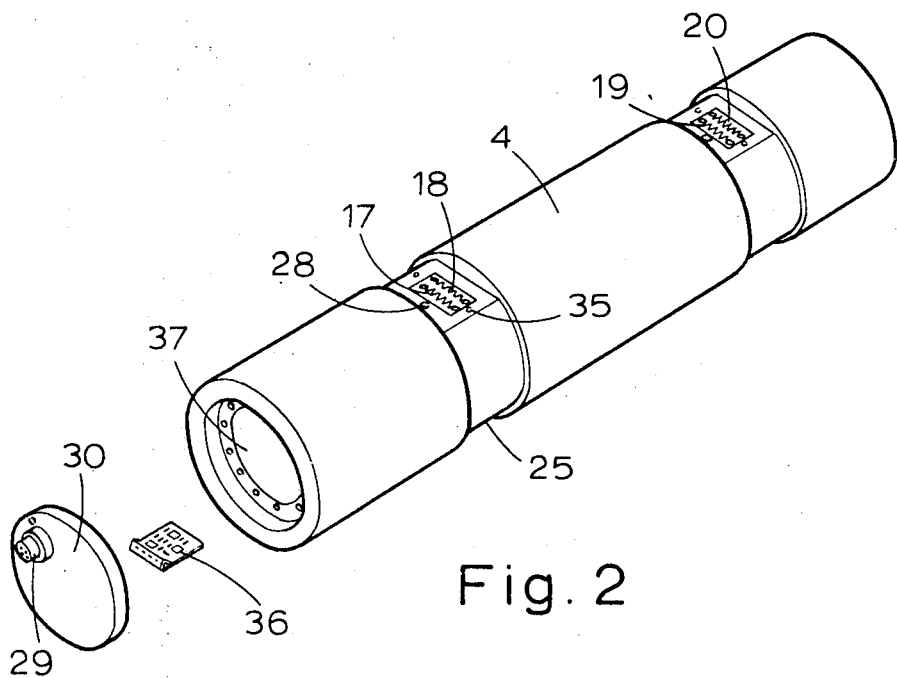
FIG. 2 represents a detailed view, partly exploded, of a pin with strain sensors shown in FIG. 1.

A mooring pulley according to the invention is similar to the hook in FIG. 1, the only difference in construction being that a conventional pulley arrangement, around which passes a mooring line, replaces the hook 13 of FIG. 1; again, either of the two pins may be constituted by the pin illustrated in FIGS. 2, 3A and 3B, but otherwise the mooring pulley is of conventional construction.

When a mooring or towing winch drum having a pin in its brake anchoring link, or a mooring fairlead with a chain or cable stopper having a pivotal pin is used as the mooring device of the invention, the conventional pin is replaced with a pin such as that shown in FIGS. 2, 3A and 3B, the construction being otherwise conventional.

A conventional mooring or towing shackle can be modified in analogous manner, i.e. its pin is provided with strain sensors in manner similar to that shown in FIGS. 2, 3A and 3B.

The following advantages are inherent in the above described embodiment of the invention over previously known mooring devices:

A. The transducer is afforded a considerable degree of mechanical protection.
B. Replacement of the transducer is reduced to a simple mechanical operation, in the event of its failure. Replacement of directly bonded gauges to the hook or pulley structure requires the services of specialist personnel and is a lengthy procedure, especially if the installation is in an exposed position.
C. Each pin can be pre-calibrated before installation. Hook or pulley installations with gauges bonded to them have either to be removed to calibration facilities or must be calibrated on site by use of a tug.

I claim:

1. A mooring device for the mooring of a vessel movable relative to the device, a line extending from the vessel to the device whereby the line moves in response to the vessel movements, said device comprising a stationary base section and a relatively pivotal section, said pivotal section comprising means for holding the line and a pair of arms, a pin extending between said arms which is subjected to shear stress when the device is in use, characterized in that the pin is provided with at least one region having a cross section with a diameter smaller than that of the bearing surface of the pin, there being mounted on said region at least one pair of strain sensors adapted to be connected into an electrical circuit capable of indicating shear strain due to force applied to the pin, said smaller diameter being such as to avoid direct compressive stresses being communicated to said region by parts of the device bearing on the pin without weakening it to an extent incompatible with its use in a mooring device, and means constraining said pin against pivoting movement relative to said pivotal section to which a mooring load is attached, said constraining means tying said pin to said arms whereby movement of the arms in response to changes in the direction of force applied by the vessel to the line results in corresponding movement of the pin, the plane of action of the strain sensors being thereby maintained substantially in alignment with the direction of any resultant applied force which produces said shear strain.

2. A mooring device according to claim 1, in which two pairs of strain sensors are provided substantially diametrically opposed on said region.

3. A mooring device according to claim 2, in which at least one pair of strain sensors are provided near each end of the pin.

4. A mooring device according to claim 3, in which said pair of strain sensors is mounted on a flattened portion of the said smaller diameter region.

5. A mooring device according to claim 2, in which said pair of strain sensors is mounted on a flattened portion of the said smaller diameter region.

6. A mooring device according to claim 1, in which at least one pair of strain sensors are provided near each end of the pin.

7. A mooring device according to claim 3, in which said pair of strain sensors is mounted on a flattened portion of the said smaller diameter region.

8. A mooring device according to claim 1, in which said pair of strain sensors is mounted on a flattened portion of the said smaller diameter region.

* * * * *